US009659597B2

(12) United States Patent
Petajan et al.

(10) Patent No.: US 9,659,597 B2
(45) Date of Patent: May 23, 2017

(54) ANNOTATING MEDIA CONTENT FOR AUTOMATIC CONTENT UNDERSTANDING

(71) Applicant: LiveClips LLC, El Segundo, CA (US)

(72) Inventors: Eric David Petajan, Watchung, NJ (US); David Eugene Weite, Woodcliff Lake, NJ (US); Douglas W. Vunic, Darien, CT (US)

(73) Assignee: LiveClips LLC, El Segundo, CA (US)

( * ) Notice: Subject to any disclaimer, the term of this patent is extended or adjusted under 35 U.S.C. 154(b) by 0 days.

(21) Appl. No.: 14/385,989

(22) PCT Filed: Apr. 22, 2013

(86) PCT No.: PCT/US2013/037545
§ 371 (c)(1),
(2) Date: Sep. 17, 2014

(87) PCT Pub. No.: WO2013/163066
PCT Pub. Date: Oct. 31, 2013

(65) Prior Publication Data
US 2015/0071618 A1 Mar. 12, 2015

Related U.S. Application Data

(63) Continuation-in-part of application No. 13/836,605, filed on Mar. 15, 2013.
(Continued)

(51) Int. Cl.
G06F 17/20 (2006.01)
G11B 27/036 (2006.01)
(Continued)

(52) U.S. Cl.
CPC ......... *G11B 27/036* (2013.01); *G06F 17/241* (2013.01); *G06F 17/30038* (2013.01);
(Continued)

(58) Field of Classification Search
CPC .............................. G11B 27/34; G06F 17/241
(Continued)

(56) References Cited

U.S. PATENT DOCUMENTS 5,091,780 A 2/1992 Pomerleau
5,189,630 A 2/1993 Barstow et al.
(Continued)

FOREIGN PATENT DOCUMENTS

EP 1197020 11/2007
EP 1968066 A1 9/2008
(Continued)

OTHER PUBLICATIONS

International Search Report and Written Opinion dated Aug. 3, 2015 in International Application No. PCT/US2015/016166 filed Feb. 17, 2015 by Eric David Petajan et al.
(Continued)

*Primary Examiner* — Thai Tran
*Assistant Examiner* — Mishawn Hunter
(74) *Attorney, Agent, or Firm* — Guntin & Gust, PLC; Douglas Schnabel

(57) ABSTRACT

A system for annotating frames in a media stream 114 includes a pattern recognition system (PRS) 108 to generate PRS output metadata for a frame; an archive 106 for storing ground truth metadata (GTM); a device to merge the GTM and PRS output metadata and thereby generate proposed annotation data (PAD) 110; and a user interface 109 for use by the human annotator HA 118. The user interface 104 includes an editor 111 and an input device 107 used by the HA 118 to approve GTM for the frame. An optimization system 105 receives the approved GTM and metadata output by the PRS 108, and adjusts input parameters for the PRS to minimize a distance metric corresponding to a difference between the GTM and PRS output metadata.

18 Claims, 4 Drawing Sheets

Related U.S. Application Data

(60) Provisional application No. 61/637,344, filed on Apr. 24, 2012.

(51) Int. Cl.
  *G06F 17/24* (2006.01)
  *H04N 21/234* (2011.01)
  *H04N 21/84* (2011.01)
  *H04N 21/854* (2011.01)
  *G06F 17/30* (2006.01)
  *G11B 27/28* (2006.01)

(52) U.S. Cl.
  CPC ....... *G11B 27/28* (2013.01); *H04N 21/23418* (2013.01); *H04N 21/23424* (2013.01); *H04N 21/84* (2013.01); *H04N 21/854* (2013.01)

(58) Field of Classification Search
  USPC ......... 715/230, 716; 382/173, 181; 386/278, 386/282
  See application file for complete search history.

(56) References Cited

U.S. PATENT DOCUMENTS

| | | | |
|---|---|---|---|
| 5,526,479 | A | 6/1996 | Barstow et al. |
| 5,539,454 | A | 7/1996 | Williams |
| 5,671,347 | A | 9/1997 | Barstow et al. |
| 5,892,536 | A | 4/1999 | Logan et al. |
| 5,923,365 | A | 7/1999 | Tamir et al. |
| 5,986,692 | A | 11/1999 | Logan et al. |
| 6,088,455 | A | 7/2000 | Logan et al. |
| 6,144,797 | A | 11/2000 | MacCormack et al. |
| 6,204,862 | B1 | 3/2001 | Barstow et al. |
| 6,920,468 | B1 | 7/2005 | Cousins et al. |
| 6,931,451 | B1 | 8/2005 | Logan et al. |
| 7,055,166 | B1 | 5/2006 | Logan et al. |
| 7,058,376 | B2 | 6/2006 | Logan et al. |
| 7,211,000 | B2 | 5/2007 | Jutzi et al. |
| 7,224,852 | B2 | 5/2007 | Lipton et al. |
| 7,373,587 | B1 | 5/2008 | Barstow et al. |
| 7,399,277 | B2 | 7/2008 | Saidara et al. |
| 7,460,149 | B1 | 12/2008 | Donovan et al. |
| 7,596,759 | B2 | 9/2009 | Verna |
| 7,742,921 | B1 | 6/2010 | Davis et al. |
| 7,904,797 | B2 | 3/2011 | Wong et al. |
| 2002/0093591 | A1 | 7/2002 | Gong et al. |
| 2002/0099695 | A1 | 7/2002 | Abajian |
| 2002/0114493 | A1 | 8/2002 | McNitt et al. |
| 2002/0184020 | A1 | 12/2002 | Shinoda |
| 2003/0160944 | A1 | 8/2003 | Foote et al. |
| 2003/0177503 | A1 | 9/2003 | Sull |
| 2003/0186743 | A1 | 10/2003 | MacGregor |
| 2004/0021685 | A1 | 2/2004 | Denoue |
| 2004/0064207 | A1 | 4/2004 | Zacks et al. |
| 2004/0068758 | A1 | 4/2004 | Daily et al. |
| 2004/0080615 | A1 | 4/2004 | Klein et al. |
| 2004/0125877 | A1 | 7/2004 | Chang et al. |
| 2004/0143604 | A1 | 7/2004 | Glenner |
| 2004/0168118 | A1 | 8/2004 | Wong |
| 2004/0205482 | A1 | 10/2004 | Basu et al. |
| 2004/0267698 | A1 | 12/2004 | Shinkai |
| 2005/0038809 | A1 | 2/2005 | Abajian |
| 2005/0149299 | A1 | 7/2005 | Bolt |
| 2006/0031236 | A1 | 2/2006 | Isogawa |
| 2006/0044446 | A1 | 3/2006 | Porter et al. |
| 2006/0136205 | A1 | 6/2006 | Song |
| 2006/0161867 | A1 | 7/2006 | Drucker |
| 2006/0227237 | A1 | 10/2006 | Kienzle |
| 2006/0246972 | A1 | 11/2006 | Thomas et al. |
| 2007/0100521 | A1 | 5/2007 | Grae |
| 2007/0101394 | A1 | 5/2007 | Fu et al. |
| 2007/0106507 | A1 | 5/2007 | Charoenruengkit et al. |
| 2007/0277092 | A1 | 11/2007 | Basson |
| 2008/0019594 | A1 | 1/2008 | Hiraizumi et al. |
| 2008/0088482 | A1 | 4/2008 | Okada et al. |
| 2008/0089666 | A1 | 4/2008 | Aman |
| 2008/0130997 | A1 | 6/2008 | Huang et al. |
| 2008/0138029 | A1 | 6/2008 | Xu et al. |
| 2008/0154908 | A1 | 6/2008 | Datar |
| 2008/0177786 | A1 | 7/2008 | Faisman et al. |
| 2008/0281592 | A1 | 11/2008 | McKoen et al. |
| 2008/0313140 | A1 | 12/2008 | Pereira |
| 2008/0317286 | A1 | 12/2008 | Thorpe |
| 2009/0024619 | A1 | 1/2009 | Dallmeier |
| 2009/0055419 | A1 | 2/2009 | Gibbon |
| 2009/0208106 | A1 | 8/2009 | Dunlop |
| 2009/0313294 | A1 | 12/2009 | Mei et al. |
| 2009/0319885 | A1 | 12/2009 | Amento |
| 2010/0123830 | A1 | 5/2010 | Vunic |
| 2010/0245072 | A1 | 9/2010 | Harel |
| 2010/0306193 | A1 | 12/2010 | Pereira |
| 2011/0052061 | A1 | 3/2011 | Jeong et al. |
| 2011/0102678 | A1 | 5/2011 | House et al. |
| 2011/0143811 | A1 | 6/2011 | Rodriguez |
| 2012/0020524 | A1 | 1/2012 | Ishikawa |
| 2012/0147264 | A1 | 6/2012 | Faisman |
| 2012/0192227 | A1 | 7/2012 | Fleischman |
| 2012/0219271 | A1 | 8/2012 | Vunic et al. |
| 2013/0124203 | A1 | 5/2013 | Scoggins, II |
| 2013/0283143 | A1 | 10/2013 | Petajan et al. |
| 2013/0293776 | A1 | 11/2013 | Shih-Fu et al. |
| 2014/0028842 | A1 | 1/2014 | Abramson |
| 2015/0227849 | A1 | 8/2015 | Jaros |

FOREIGN PATENT DOCUMENTS

| | | |
|---|---|---|
| WO | 2007/132395 A1 | 11/2007 |
| WO | 2012/155279 A2 | 11/2012 |

OTHER PUBLICATIONS

Lu, Wei-Lwun et al.; "Learning to Track and Identify Players from Broadcast Sports Videos"; IEEE Transactions on Pattern Analysis and Machine Intelligence; IEEE Computer Society; USA; vol. 35, No. 7; Jul. 1, 2013 (Jul. 1, 2013); pp. 1704-1716; XP011510389; ISSN: 0162-8828; DOI: 10.1109/TPAMI.2012.242; paragraph [02. 2].

Abdul Halin, Alfian et al.; "Soccer Event Detection Via Collaborative Multimodal Feature Analysis and Candidate Ranking"; Nov. 30, 2011 (Nov. 30, 2011); XP055204609; Retrieved from the internet: URL:http://www.iajit.org/PDF/vol.10,no.5/4565-9.pdf; [retrieved on Jul. 24, 2015]; p. 1-p. 3.

Babaguchi, Noboru et al.; "Intermodal Collaboration: A Strategy for Semantic Content Analysis for Broadcasted Sports Video"; Proceedings 2003 International Conference on Image Processing (Cat. No. 03CH37429); Barcelona, Spain; Sep. 14-16, 2003; IEEE; Piscataway, New Jersey, USA; vol. 1; Sep. 14, 2003 (Sep. 14, 2003); pp. 13-16; XP01067054; ISBN: 978-0-7803-7750-9; p. 16.

D'Orazio et al.; "A Review of Vision-Based Systems for Soccer Video Analysis"; Pattern Recognition; Elsevier Ltd.; vol. 43, No. 8; Aug. 1, 2010 (Aug. 1, 2010); pp. 2911-2926; XP002612059; ISSN:0031-3203; DOI: 10.1016/J. PATCOG.2010.03.009 [retrieved on Mar. 19, 2010] the whole document.

Invitation to Pay Additional Fees and, Where Applicable, Protest Fee and Annex Communication relating to the results of the Partial International Search dated Jun. 18, 2015 in International Application No. PCT/US2015/016166 filed Feb. 17, 2015 by Eric David Petajan et al.

Written Opinion of the International Preliminary Examining Authority dated Jun. 28, 2013 in International Application No. PCT/US2012/038516 filed May 18, 2012 by Douglas W. Vunic et al.

International Search Report and Written Opinion dated Sep. 6, 2013 in International Application Application No. PCT/US2013/037545 filed Apr. 22, 2013 by Eric D. Petajan et al.

Non-final Office action dated Dec. 22, 2011 in U.S. Appl. No. 12/272,170, filed Nov. 17, 2008 by Douglas W. Vunic.

(56) References Cited

OTHER PUBLICATIONS

Non-final Office action dated May 23, 2013 in U.S. Appl. No. 12/272,170, filed Nov. 17, 2008 by Douglas W. Vunic.
Final Rejection dated Feb. 4, 2014 in U.S. Appl. No. 12/272,170, filed Nov. 17, 2008 by Douglas W. Vunic.
Final Rejection dated Aug. 26, 2014 in U.S. Appl. No. 12/272,170, filed Nov. 17, 2008 by Douglas W. Vunic.
Final Rejection dated Aug. 13, 2012 in U.S. Appl. No. 12/272,170, filed Nov. 17, 2008 by Douglas W. Vunic.
Notice of Allowance dated Dec. 30, 2014 in U.S. Appl. No. 12/272,170, filed Nov. 17, 2008 by Douglas W. Vunic.
Rui, Yong; Gupta, Anoop; Acero, Alex; "Automatically Extracting Highlights for TV Baseball Programs"; Proceedings ACM Multimedia; Oct. 30, 2000; pp. 105-115; XP002272069.
Supplementary European Search Report dated Sep. 25, 2014 in European Patent Application No. 12785552.6 filed May 18, 2012 by Douglas W. Vunic et al.
International Search Report and Written Opinion dated Dec. 27, 2012 in International Application No. PCT/US2012/038516 filed May 18, 2012 by Douglas W. Vunic et al.
Sadlier, David A.; O'Connor, Noel E.; "Event Detection Based on Generic Characteristics of Field-Sports"; In: ICME 2005-Proceedings of the IEEE International Conference on Multimedia and Expo; Jul. 6-8, 2005; Amsterdam, The Netherlands; pp. 1-4.
Diamantopoulis, Michael Spann; "Event Detection for Intelligent Car Park Video Surveillance"; Science Direct; available online at www.sciencedirect.com; Jun. 13, 2005; 11 pp.
National Center for Transit Research et al.; "Evaluation of Smart Video for Transit Event Detection"; Project #BD549-49, Final Report; Jun. 2009; 85 pp.
Tian, Yin-Li et al.; "Event Detection, Query, and Retrieval for Video Surveillance"; Book Chapter for Artificial Intelligence for Maximizing Content Based Image Retrieval; pp. 1-3.
Beale, Stephen et al.; "Semantic Analysis in the Mikrokosmos Machine Translation Project"; In Proc. Symposium on NLP; Saset Park University; Bankok, Thailand; 1995.
MPEG-7 Overview (version 10); (ISO/IEC JTC1/SC29/WG11N6828); Palma de Mallorca; Oct. 2004; http://mpeg.chiariglione.org/standards/mpeg-7/mpeg-7.html; 70 pp.
Martinez, Jose M. et al.; "MPEG-7: The Generic Multimedia Content Description Standard"; Copyright 2002 IEEE; reprinted from IEEE Computer Society; Apr.-Jun. 2002; pp. 78-87.
Wang, F. et al.; "A Generic Framework for Semantic Sports Video Analysis Using Dynamic Bayesian Networks"; IEEE, Proceedings of the 11th International Multimedia Modeling Conference; 2005.
International Search Report dated Apr. 12, 2010 in International Application No. PCT/US2009/064573 filed Nov. 16, 2009 by Douglas W. Vunic.
Non-final Office action dated Jul. 8, 2013 in U.S. Appl. No. 13/111,738, filed May 19, 2011 by Douglas W. Vunic et al.
Final Rejection dated Mar. 14, 2014 in U.S. Appl. No. 13/111,738, filed May 19, 2011 by Douglas W. Vunic et al.
Final Rejection dated Sep. 9, 2014 in U.S. Appl. No. 13/111,738, filed May 19, 2011 by Douglas W. Vunic et al.
Notice of Allowance dated Dec. 22, 2014 in U.S. Appl. No. 13/111,738, filed May 19, 2011 by Douglas W. Vunic et al.
Written Opinion of the International Searching Authority dated Apr. 12, 2010 for International Application No. PCT/US2009/064573 filed Nov. 16, 2009 by Douglas W. Vunic.
Non-final Office action dated Oct. 6, 2015 in U.S. Appl. No. 13/836,605, filed Mar. 15, 2013 by Eric David Petajan et al.
Notice of Allowance dated Feb. 11, 2016 in U.S. Appl. No. 14/186,163, filed Feb. 21, 2014 by Eric David Petajan et al.
Supplementary Partial European Search Report dated Jun. 16, 2016 in European Patent Application No. 13781985.0 filed Apr. 22, 2013 by Eric David Petajan et al.

ANNOTATING MEDIA CONTENT FOR AUTOMATIC CONTENT UNDERSTANDING

FIELD OF THE DISCLOSURE

This disclosure relates to media presentations (e.g. live sports events), and more particularly to a system for improving performance by generating annotations for the media stream.

BACKGROUND OF THE DISCLOSURE

A media presentation, such as a broadcast of an event, may be understood as a stream of audio/video frames (live media stream). It is desirable to add information to the media stream to enhance the viewer's experience; this is generally referred to as annotating the media stream. The annotation of a media stream is a tedious and time-consuming task for a human. Visual inspection of text, players, balls, and field/court position is mentally taxing and error prone. Keyboard and mouse entry are needed to enter annotation data but are also error prone and mentally taxing. Accordingly, systems have been developed to at least partially automate the annotation process.

Pattern Recognition Systems (PRS), e.g. computer vision or Automatic Speech Recognition (ASR), process media streams in order to generate meaningful metadata. Recognition systems operating on natural media streams always perform with less than absolute accuracy due to the presence of noise. Computer Vision (CV) is notoriously error prone and ASR is only useable under constrained conditions. The measurement of system accuracy requires knowledge of the correct PRS result, referred to here as Ground Truth Metadata (GTM). The development of a PRS requires the generation of GTM that must be validated by Human Annotators (HA). GTM can consist of positions in space or time, labeled features, events, text, region boundaries, or any data with a unique label that allows referencing and comparison.

A compilation of acronyms used herein is appended to this Specification.

There remains a need for a system that can reduce the human time and effort required to create the GTM.

SUMMARY OF THE DISCLOSURE

We refer to a system for labeling features in a given frame of video (or audio) or events at a given point in time as a Media Stream Annotator (MSA). If accurate enough, a given PRS automatically generates metadata from the media streams that can be used to reduce the human time and effort required to create the GTM. According to an aspect of the disclosure, an MSA system and process, with a Human-Computer Interface (HCI), provides more efficient GTM generation and PRS input parameter adjustment.

GTM is used to verify PRS accuracy and adjust PRS input parameters or to guide algorithm development for optimal recognition accuracy. The GTM can be generated at low levels of detail in space and time, or at higher levels as events or states with start times and durations that may be imprecise compared to low-level video frame timing.

Adjustments to PRS input parameters that are designed to be static during a program should be applied to all sections of a program with associated GTM in order to maximize the average recognition accuracy and not just the accuracy of the given section or video frame. If the MSA processes live media, the effect of any automated PRS input parameter adjustments must be measured on all sections with (past and present) GTM before committing the changes for generation of final production output.

A system embodying the disclosure may be applied to both live and archived media programs and has the following features:
 Random access into a given frame or section of the archived media stream and associated metadata
 Real-time display or graphic overlay of PRS-generated metadata on or near video frame display
 Single click approval of conversion of Proposed Annotation Data (PAD) into GTM
 PRS recomputes all metadata when GTM changes
 Merge metadata from 3rd parties with human annotations
 Graphic overlay of compressed and decoded metadata on or near decoded low bit-rate video to enable real-time operation on mobile devices and consumer-grade internet connections The foregoing has outlined, rather broadly, the preferred features of the present disclosure so that those skilled in the art may better understand the detailed description of the disclosure that follows. Additional features of the disclosure will be described hereinafter that form the subject of the claims of the disclosure. Those skilled in the art should appreciate that they can readily use the disclosed conception and specific embodiment as a basis for designing or modifying other structures for carrying out the same purposes of the present disclosure and that such other structures do not depart from the spirit and scope of the disclosure in its broadest form.

DETAILED DESCRIPTION

The accuracy of any PRS depends on the application of constraints that reduce the number or range of possible results. These constraints can take the form of a priori information, physical and logical constraints, or partial recognition results with high reliability. A priori information for sports includes the type of sport, stadium architecture and location, date and time, teams, players, broadcaster, language, and the media ingest process (e.g., original A/V resolution and transcoding). Physical constraints include camera inertia, camera mount type, lighting, and the physics of players, balls, equipment, courts, fields, and boundaries. Logical constraints include the rules of the game, sports production methods, uniform colors and patterns, and scoreboard operation. Some information can be reliably extracted from the media stream with minimal a priori information and can be used to "boot strap" subsequent recognition processes. For example, the presence of the graphical miniboard overlaid on the game video (shown in FIG. 4) can be detected with only knowledge of the sport and the broadcaster (e.g., ESPN, FOX Sports, etc).

If a live media sporting event is processed in real time, only the current and past media streams are available for pattern recognition and metadata generation. A recorded sporting event can be processed with access to any frame in the entire program. The PRS processing a live event can become more accurate as time progresses since more information is available over time, while any frame from a recorded event can be analyzed repeatedly from the past or the future until maximum accuracy is achieved.

The annotation of a media stream is a tedious and time-consuming task for a human. Visual inspection of text, players, balls, and field/court position is mentally taxing and error prone. Keyboard and mouse entry are needed to enter annotation data but are also error prone and mentally taxing. Human annotation productivity (speed and accuracy) is greatly improved by properly displaying available automatically generated Proposed Annotation Data (PAD) and thereby minimizing the mouse and keyboard input needed to edit and approve the PAD. If the PAD is correct, the Human Annotator (HA) can simultaneously approve the current frame and select the next frame for annotation with only one press of a key or mouse button. The PAD is the current best automatically generated metadata that can be delivered to the user without significant delay. Waiting for the system to maximize the accuracy of the PAD may decrease editing by the HA but will also delay the approval of the given frame.

Figure 1:
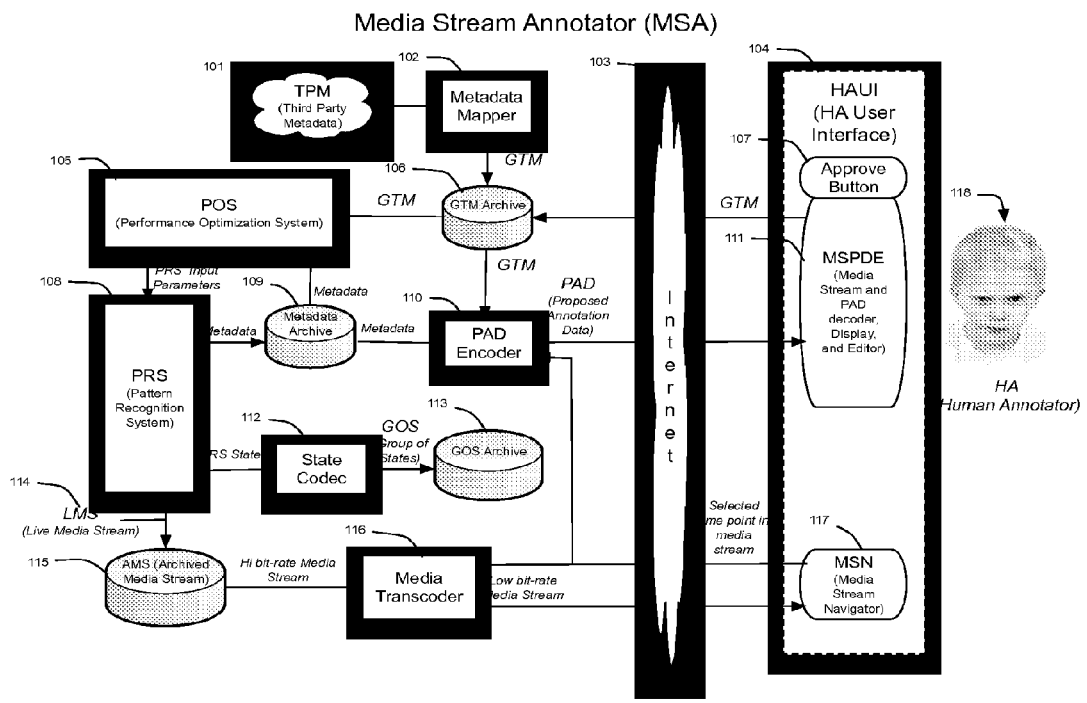
FIG. 1 is a schematic illustration of the Media Stream Annotator (MSA), according to an embodiment of the disclosure.

FIG. 1 shows a Media Stream Annotator (MSA) system according to an embodiment of the disclosure. The MSA ingests both live and archived media streams (LMS 114 and AMS 115), and optional Third Party Metadata (TPM) 101 and input from the HA 118. The PAD is derived from a combination of PRS 108 result metadata and TPM 101. Metadata output by PRS 108 is archived in Metadata Archive 109. If the TPM 101 is available during live events the system can convert the TPM 101 to GTM via the Metadata Mapper 102 and then use the Performance Optimization System (POS) 105 to adjust PRS Input Parameters to improve metadata accuracy for both past (AMS 115) and presently ingested media (LMS 114). The PAD Encoder 110 merges GTM with metadata for each media frame and encodes the PAD into a compressed form suitable for transmission to the Human Annotator User Interface (HAUI) 104 via a suitable network, e.g. Internet 103. This information is subsequently decoded and displayed to the HA, in a form the HA can edit, by a Media Stream and PAD Decoder, Display and Editor (MSPDE) 111. The HAUI also includes a Media Stream Navigator (MSN) 117 which the HA uses to select time points in the media stream whose corresponding frames are to be annotated. A low bit-rate version of the media stream is transcoded from the AMS by a Media Transcoder 116 and then transmitted to the HAUI.

As GTM is generated by the HA 118 and stored in the GTM Archive 106, the POS 105 compares the PRS 108 output metadata to the GTM and detects significant differences between them. During the design and development of the PRS 108, input parameters are set with initial estimated values that produce accurate results on an example set of media streams and associated GTM. These parameter values are adjusted by the POS 105 until the difference between the all GTM and the PRS 108 generated metadata is minimized.

During development (as opposed to live production) the POS 105 does not need to operate in real time and exhaustive optimization algorithms may be used. During a live program the POS 105 should operate as fast as possible to improve PRS 108 performance each time new GTM is generated by the HA 118; faster optimization algorithms are therefore used during a live program. The POS 105 is also invoked when new TPM 101 is converted to GTM.

The choice of distance metric between PRS 108 output metadata and GTM depends on the type of data and the allowable variation. For example, in a presentation of a football game the score information extracted from the miniboard must be absolutely accurate while the spatial position of a player on the field can vary. If one PRS input parameter affects multiple types of results, then the distance values for each type can be weighted in a linear combination of distances in order to calculate a single distance for a given frame or time segment of the game.

A variety of TPM 101 (e.g. from stats.com) is available after a delay period from the live action that can be used as GTM either during development or after the delay period during a live program. Since the TPM is delayed by a non-specific period of time, it must be aligned in time with the program. Alignment can either be done manually, or the GTM can be aligned with TPM 101, and/or the PRS 108 result metadata can be aligned using fuzzy matching techniques.

The PRS 108 maintains a set of state variables that change over time as models of the environment, players, overlay graphics, cameras, and weather are updated. The arrival of TPM 101 and, in turn, GTM can drive changes to both current and past state variables. If the history of the state variables is not stored persistently, the POS 105 would have to start the media stream from the beginning in order to use the PRS 108 to regenerate metadata using new PRS 108 Input Parameters. The amount of PRS 108 state variable information can be large, and is compressed using State Codec 112 into one or more sequences of Group Of States (GOS) such that a temporal section of PRS States is encoded and decoded as a group for greater compression efficiency and retrieval speed. The GOS is stored in a GOS Archive 113. The number of media frames in a GOS can be as few as one.

If the PRS 108 result metadata is stored persistently, the HA can navigate to a past point in time and immediately retrieve the associated metadata or GTM via the PAD Encoder 110, which formats and compresses the PAD for delivery to the HA 118 over the network.

Figure 2:
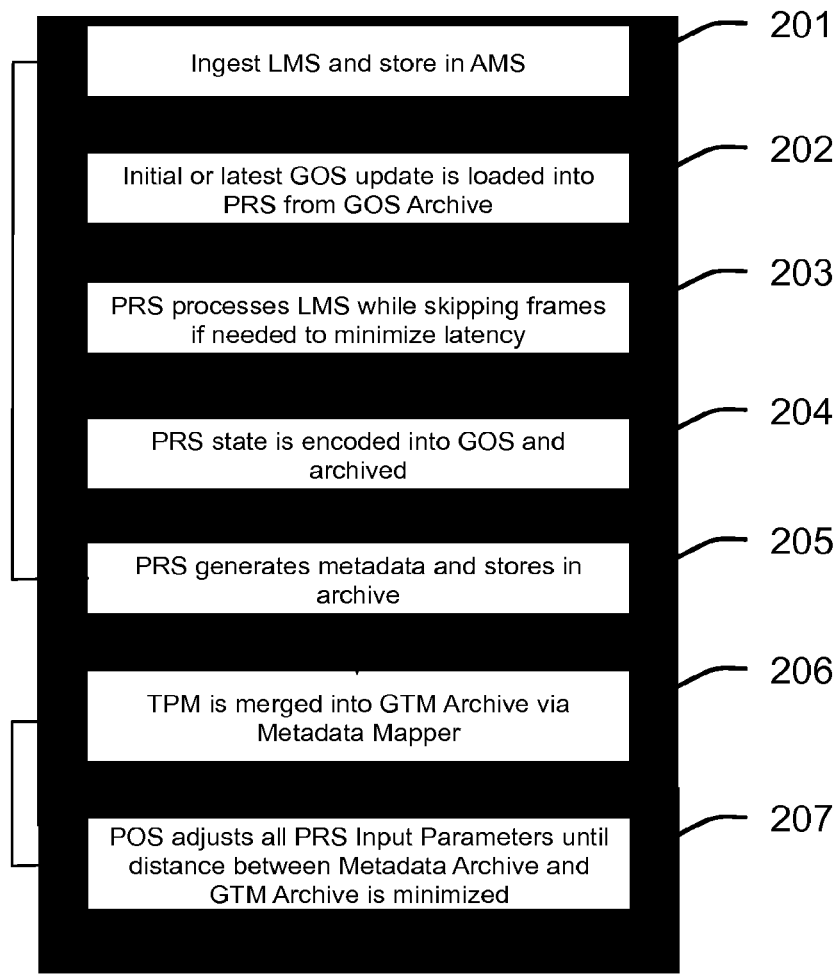
FIG. 2 is a schematic illustration of the Media Annotator flow chart during Third Party Metadata (TPM) ingest, according to an embodiment of the disclosure.

FIG. 2 shows a flow chart for MSA operation, according to an embodiment of the disclosure in which both a live media stream (LMS) and TPM are ingested. All LMS is archived in the AMS (step 201). At system startup, the initial or default values of the GOS are input to the PRS which then starts processing the LMS in real time (step 202). If the PRS does not have sufficient resources to process every LMS frame, the PRS will skip frames to minimize the latency between a given LMS frame and its associated result Metadata (step 203). Periodically, the internal state variable values of the PRS are encoded into GOS and archived (step 204). Finally, the PRS generates metadata which is archived (step 205); the process returns to step 201 and the next or most recent next media frame is ingested. The processing loop 201-205 may iterate indefinitely.

When TPM arrives via the Internet, it is merged with any GTM that exists for that media frame via the Metadata Mapper (step 206). The POS is then notified of the new GTM and generates new sets of PRS Input Parameters, while comparing all resulting Metadata to any corresponding GTM for each set until an optimal set of PRS Input Parameters are found that minimize the global distance between all GTM and the corresponding Metadata (step 207).

Figure 3:
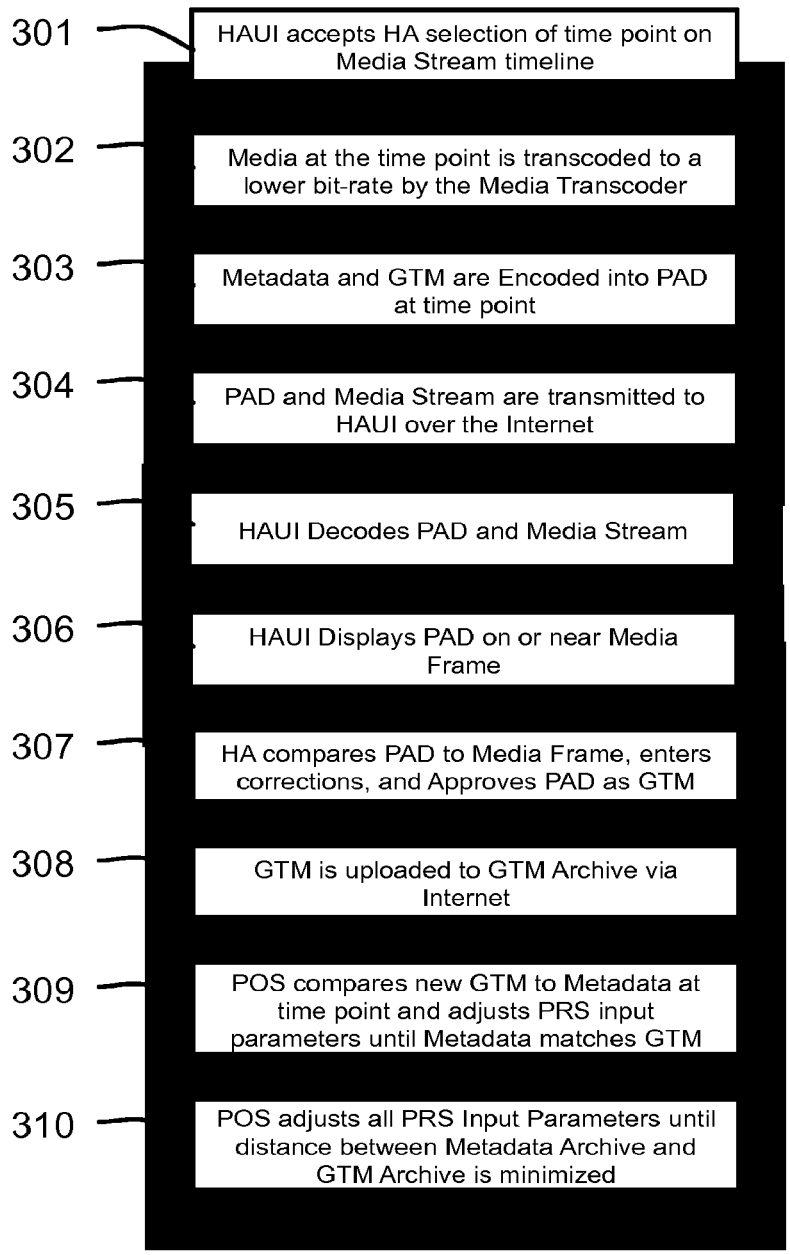
FIG. 3 is a schematic illustration of the Media Annotator flow chart during Human Annotation, according to an embodiment of the disclosure.

FIG. 3 shows a flow chart for MSA operation while the HA approves new GTM. This process operates in parallel with the process shown in the flowchart of FIG. 2. The HA must first select a point on the media stream timeline for annotation (step 301). The HA can find a point in time by dragging a graphical cursor on a media player while viewing a low bit-rate version of the media stream transcoded from the AMS (step 302). The Metadata and any existing GTM associated with the selected time point are retrieved from their respective archives 109, 106 and encoded into the PAD (step 303); transmitted with the Media Stream to the HAUI over the Internet (step 304); and presented to the HA via the HAUI after decoding both PAD and low bit-rate Media Stream (step 305). The HAUI displays the PAD on or near the displayed Media Frame (step 306). The HA compares the PAD with the Media Frame and either clicks on an Approve button 107 or corrects the PAD using an editor and approves the PAD (step 307). After approval of the PAD, the HAUI transmits the corrected and/or approved PAD as new GTM for storage in the GTM Archive (step 308). The POS is then notified of the new GTM and generates new sets of PRS Input Parameters, while comparing all resulting Metadata to any corresponding GTM for each set (step 309) until an optimal set of PRS Input Parameters are found that minimize the global distance between all GTM and the corresponding Metadata (step 310).

If the MSA is operating only on the AMS (and not on the LMS), the POS can perform more exhaustive and time consuming algorithms to minimize the distance between GTM and Metadata; the consequence of incomplete or less accurate Metadata is more editing time for the HA. If the MSA is operating on LMS during live production, the POS is constrained to not update the PRS Input Parameters for live production until the Metadata accuracy is maximized.

The HA does not need any special skills other than a basic knowledge of the media stream content (e.g. rules of the sporting event) and facility with a basic computer interface. PRS performance depends on the collection of large amounts of GTM to ensure that optimization by the POS will result in optimal PRS performance on new media streams. Accordingly, it is usually advantageous to employ multiple HAs for a given media stream. The pool of HAs is increased if the HAUI client can communicate with the rest of the system over the consumer-grade internet or mobile internet connections which have limited capacity. The main consumer of internet capacity is the media stream that is delivered to the HAUI for decoding and display. Fortunately, the bit-rate of the media stream can be greatly lowered to allow carriage over consumer or mobile internet connections by transcoding the video to a lower resolution and quality. Much of the bit-rate needed for high quality compression of sporting events is applied to complex regions in the video, such as views containing the numerous spectators at the event; however, the HA does not need high quality video of the spectators for annotation. Instead, the HA needs a minimal visual quality for the miniboard, player identification, ball tracking, and field markings which is easily achieved with a minimal compressed bit-rate.

The PAD is also transmitted to the HAUI, but this information is easily compressed as text, graphical coordinates, geometric objects, color properties or animation data. All PAD can be losslessly compressed using statistical compression techniques (e.g. zip), but animation data can be highly compressed using lossy animation stream codecs such as can be found in the MPEG-4 SNHC standard tools (e.g. Face and Body Animation and 3D Mesh Coding).

Figure 4:
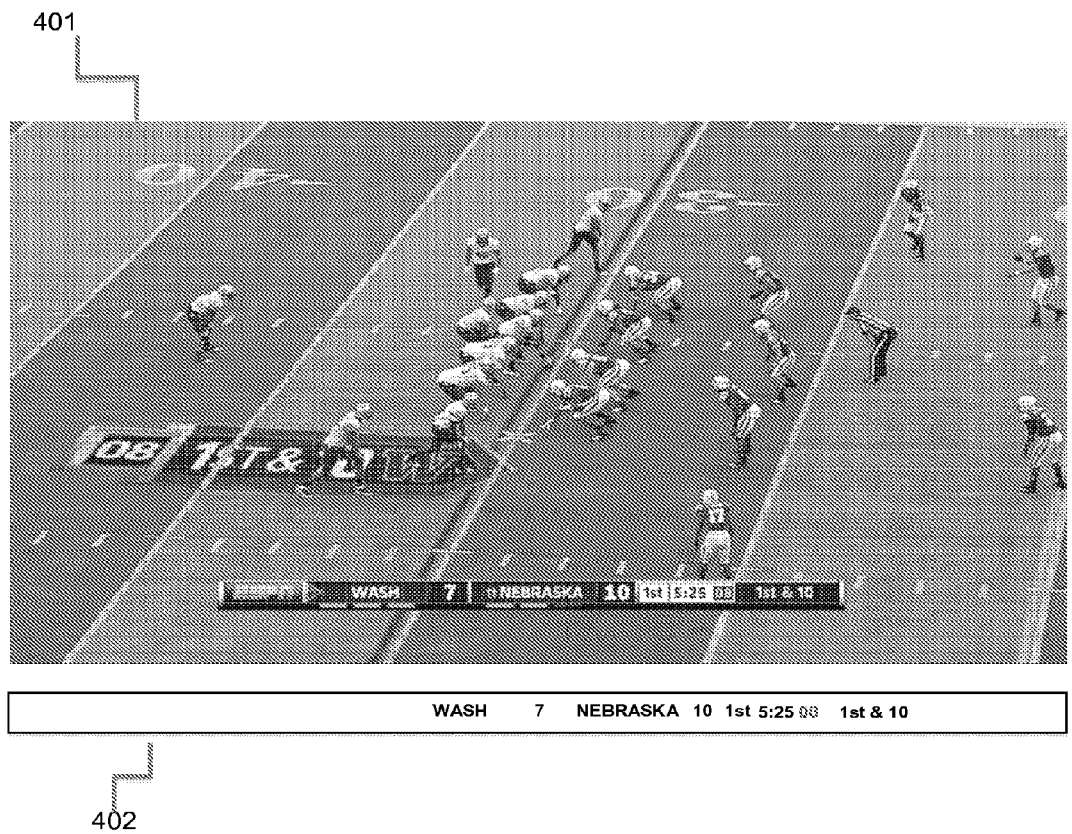
FIG. 4 is a schematic illustration of a football miniboard, according to an embodiment of the disclosure.

The display of the transmitted and decoded PAD to the HA is arranged for clearest viewing and comparison between the video and the PAD. For example, as shown in FIG. 4, the miniboard content from the PAD should be displayed below the video frame in its own window pane 402 and vertically aligned with the miniboard in the video 401. PAD content relating to natural (non-graphical) objects in the video should be graphically overlayed on the video.

Editing of the PAD by the HA can be done either in the miniboard text window directly for miniboard data or by dragging spatial location data directly on the video into the correct position (e.g. field lines or player IDs). The combined use of low bit-rate, adequate quality video and compressed text, graphics and animation data which is composited on the video results in a HAUI that can be used with low bit-rate internet connections.

Referring back to FIG. 1, The Metadata Archive 109 and the GTM Archive 106 are ideally designed and implemented to provide fast in-memory access to metadata while writing archive contents to disk as often as needed to allow fast recovery after system failure (power outage, etc). In addition to the inherent speed of memory access (vs disk access), the metadata archives should ideally be architected to provide fast search and data derivation operations. Fast search is needed to find corresponding entries in the GTM 106 vs Metadata 109 archives, and to support the asynchronous writes to the GTM Archive 106 from the Metadata Mapper 102. Preferred designs of the data structures in the archives that support fast search include the use of linked lists and hash tables. Linked lists enable insert edit operations without the need to move blocks of data to accommodate new data. Hash tables provide fast address lookup of sparse datasets.

The ingest of TPM 101 requires that the TPM timestamps be aligned with the GTM 106 and Metadata 109 Archive timestamps. This alignment operation may involve multiple passes over all datasets while calculating accumulated distance metrics to guide the alignment. The ingest of multiple overlapping/redundant TPM requires that a policy be established for dealing with conflicting or inconsistent metadata. In case there is conflict between TPMs 101, the Metadata Mapper 102 should ideally compare the PRS 108 generated Metadata 109 to the conflicting TPMs 101 in case other prior knowledge does not resolve the conflict. If the conflict can't be reliably resolved, then a confidence value should ideally be established for the given metadata which is also stored in the GTM 106. Alternatively, conflicting data can be omitted from the GTM 106.

The GTM 106 and Metadata 109 Archives should ideally contain processes for efficiently performing common operations on the archives. For example, if the time base of the metadata needs adjustment, an internal archive process could adjust each timestamp in the whole archive without impacting other communication channels, or tying up other processing resources.

An example of TPM is the game clock from a live sporting event. TPM game clocks typically consist of an individual message for each tick/second of the clock containing the clock value. The delay between the live clock value at the sports venue and the delivered clock value message can be seconds or tens of seconds with variation. The PRS is recognizing the clock from the live video feed and the start time of the game is published in advance. The Metadata Mapper 102 should use all of this information to accurately align the TPM clock ticks with the time base of the GTM 106 and Metadata 109 Archives. At the beginning of the game, there might not be enough data to determine this alignment very accurately, but as time moves forward, more metadata is accumulated and past alignments can be update to greater accuracy.

Another desirable feature of the GTM 106 and Metadata 109 archives is the ability to virtually repopulate the archives as an emulation of replaying of the original ingest and processing of the TPM. This emulation feature is useful for system tuning and debugging.

An exemplary implementation of the system and method discussed herein is during an American football game the play (aka 40/25) clock counts down either 40 or 25 seconds and stops or disappears when the play starts (if it hasn't counted down to zero). If the recognition of the play clock in the PRS is not accurate enough then the detection of the beginning of the play is less reliable. FIG. 4 shows the miniboard play clock with a value of "08" in block 401 and block 402 shows the PRS results from the miniboard including the "08" play clock value. TPM provides live data streams containing the play clock (one value per second) plus the game clock, score, etc. TPM is expected to arrive too late for direct use in real time for game processing but the POS (shown in FIG. 1) compares the TPM play clock values with the PRS game clock output values after aligning their respective timestamps. The digit recognizer in the PRS has operational parameters that are set to default at system initialization. When TPM play clock data enters the POS as GTM the POS adjusts the PRS parameters and stores the digit recognition result for each parameter value. PRS parameters are adjusted and associated results are tested until the parameters are optimized. One optimization technique is to test a range of a given parameter value from a minimum to a maximum value and store the correctness of the result for each parameter value. The optimal parameter value is taken as the value equidistant between the minimum and maximum value that produces a correct result.

An alternative to using TPM for GTM, a Human Annotator (HA) can select a frame of video and annotate the play clock value for that frame. This value becomes the GTM that is input to the POS and PRS parameter optimization proceeds as described above. As multiple digits are input as GTM to the POS, optimal PRS parameter values may not be equal across different digits within a frame or between different frames. In this case the POS can either compute the average of the individual optimal PRS parameter values or search for common PRS parameter values that produce correct results for each digit in the GTM.

Since the POS operates while the PRS is processing the Live Media Streams (LMS), the new optimized PRS parameters can be used immediately if the PRS is running well enough and past PRS output does not have to be recalculated. However, if the PRS is not functioning accurately due to suboptimal parameter values, or the past PRS output must be recomputed, the PRS can look up its past state in the GOS Archive and rerun the game from the past to the present faster than real time (assuming sufficient computing resources to process both the LMS in real time and the AMS faster than real time). When the AMS processing catches up to the present, the PRS will stop processing the AMS and the more accurate Metadata output from the PRS will replace to old Metadata in the Metadata Archive.

COMPILATION OF ACRONYMS

AMS Archived Media Stream
ASR Automatic Speech Recognition
CV Computer Vision
GOS Group Of States
GTM Ground Truth Metadata
HA Human Annotators
HAUI Human Annotator User Interface
HCl Human Computer Interface
LMS Live Media Stream
MSA Media Stream Annotator
MSN Media Stream Navigator
MSPDE Media Stream and PAD Decoder
PAD Proposed Annotation Data
POS Performance Optimization System
PRS Pattern Recognition System
TPM Third Party Metadata

We claim:

1. A system to annotate media content, comprising:
a pattern recognition system (PRS) having an initial set of input parameters that generates PRS output metadata associated with a frame of a media stream;
an archive for storing ground truth metadata (GTM) associated with the same frame of the media stream;
a device to merge the GTM and the PRS output metadata and thereby generate proposed annotation data (PAD); and
a user interface for use by a human annotator (HA) including an editor and an input device to approve or edit the PAD for the frame; and
an optimization system to adjust input parameters for the PRS to minimize a single distance metric corresponding to a difference between the GTM and PRS output metadata, wherein each type of GTM is compared to a corresponding type of the PRS output metadata to generate a plurality of distance metrics by type, wherein the single distance metric is computed by combining the plurality of distance metrics by type, and wherein one type of the PRS output metadata includes spatial position.

2. The system of claim 1, wherein the GTM is obtained from one or more of third party metadata, archived media stream and the HA.

3. The system of claim 2, wherein a time delay between third party metadata and the media stream is corrected by alignment.

4. The system of claim 2, further comprising a plurality of user interfaces and a communication network that enables a plurality of HAs to interface with the same media stream.

5. The system of claim 2, wherein the system converts approved PAD to GTM.

6. The system of claim 5, wherein the system graphically overlays the approved PAD on the media stream.

7. The system of claim 1, wherein the optimization system adjusts the initial set of input parameters of the PRS to minimize the difference between the GTM and PRS output metadata, thereby increasing PRS accuracy.

8. The system of claim 1, wherein the computing of the single distance metric includes weighting the plurality of distance metrics by type.

9. A method comprising the steps of:
receiving data from a media stream, the data organized into frames;
processing the data using a pattern recognition system (PRS);
storing a state of the PRS;
generating metadata associated with the frame using the PRS;
receiving input characterized as ground truth metadata (GTM), into an optimization system; and
adjusting input parameters for the PRS to minimize a single distance metric corresponding to a difference between the GTM and PRS output metadata, wherein each type of GTM is compared to a corresponding type of the PRS output metadata to generate a plurality of distance metrics by type, wherein the single distance metric is computed by combining the plurality of distance metrics by type, and wherein one type of the PRS output metadata includes spatial position.

10. The method of claim 9, wherein said input is obtained from one or more of archived media streams, third party metadata and one or more human annotators.

11. The method of claim 10, wherein subsequent to receiving said input, said GTM and said metadata associated with said PRS are temporally aligned.

12. The method of claim 10, wherein said GTM and said metadata associated with said PRS are continuously stored and memory and periodically stored to disk thereby enabling fast recovery from system failure.

13. A method comprising the steps of:
receiving from a human annotator (HA), via a human annotator user interface (HAUT), information regarding a time point selected by the HA on a timeline of a media stream;
merging existing ground truth metadata (GTM) relating to a media frame corresponding to the selected time point with pattern recognition system (PRS) output metadata relating to said media frame, thereby generating proposed annotation data (PAD) for the media frame;
displaying the media frame and the PAD to the HA;
receiving input from the HA including correction and/or approval of the PAD, where approved PAD is characterized as new GTM related to the selected time point;
storing the new GTM;
comparing the PRS output metadata and the new GTM related to the selected time point; and
adjusting PRS input parameters so that a single distance metric corresponding to a difference between the new GTM and PRS output metadata related to the selected time point is minimized, wherein each type of GTM is compared to a corresponding type of the PRS output metadata to generate a plurality of distance metrics by type, wherein the single distance metric is computed by combining the plurality of distance metrics by type, and wherein one type of the PRS output metadata includes spatial position.

14. The method of claim 13, in that said GTM is obtained from one or more of archived media streams, third party metadata, said human annotators and other human annotators.

15. The method of claim 14, wherein when said human annotator approves said PAD, said PAD is graphically overlaid on said media stream.

16. A method comprising the steps of:
generating output metadata associated with a frame of a media stream, output by a pattern recognition system (PRS);
storing in an archive input from a human annotator (HA) related to the frame, characterized as ground truth metadata (GTM);
merging the GTM and the output metadata of the PRS to thereby generate proposed annotation data (PAD); and
displaying the PAD to the HA by a user interface;
receiving via the user interface an input from the HA indicating approval of the GTM for the frame; and
adjusting input parameters for the PRS using an optimization system, to minimize a single distance metric corresponding to a difference between the GTM and the output metadata of the PRS, wherein each type of GTM is compared to a corresponding type of the PRS output metadata to generate a plurality of distance metrics by type, wherein the single distance metric is computed by combining the plurality of distance metrics by type, and wherein the type of metadata includes spatial position.

17. The method of claim 16, wherein said GTM is obtained from one or more of archived media streams, third party metadata, said human annotators and other human annotators.

18. The method of claim 17, wherein, when said human annotator approves said PAD, said PAD is graphically overlaid on said media stream.

* * * * *